United States Patent [19]
Gauthier et al.

[11] Patent Number: 5,914,965
[45] Date of Patent: Jun. 22, 1999

[54] SERIAL OUTPUT SELF-TEST CIRCUIT

[75] Inventors: John Gauthier, Kanata; David Okura, Nepean, both of Canada

[73] Assignee: Northern Telecom Limited, Montreal, Canada

[21] Appl. No.: 08/855,695

[22] Filed: May 8, 1997

[51] Int. Cl.⁶ ................................................ G06F 11/00
[52] U.S. Cl. ............................ 371/5.1; 371/67.1; 371/68
[58] Field of Search ................................. 371/5.1, 67.1, 371/48, 37.12; 375/376

[56] References Cited

U.S. PATENT DOCUMENTS

| | | | |
|---|---|---|---|
| 4,178,582 | 12/1979 | Richman | 340/146.1 E |
| 4,558,447 | 12/1985 | Freeman et al. | 371/71 |
| 4,914,379 | 4/1990 | Maeno | 371/22.3 |
| 5,003,539 | 3/1991 | Takemoto et al. | 371/37.12 |
| 5,471,502 | 11/1995 | Ishizeti | 375/376 |

*Primary Examiner*—Phung M. Chung

[57] ABSTRACT

A self-test circuit for a fibre optic transmitter is provided. The transmitter includes amplification circuitry which amplifies a first serial digital signal and introduces an unknown delay to produce a second serial digital signal. To detect a failure of the amplification circuitry, the first digital signal is passed through a shift register. When the shift register contains all ones or all zeros, a comparison of the shift register bit type (one or zero) is made with a most recent bit in the second digital signal. If a mismatch is detected, then an error signal is generated.

21 Claims, 2 Drawing Sheets

SERIAL OUTPUT SELF-TEST CIRCUIT

FIELD OF THE INVENTION

The invention relates to a self-test circuit for testing a serial output circuit.

BACKGROUND OF THE INVENTION

Fibre optic transmitters for transmitting serial data streams frequently include LED (light emitting diode) driver circuits controlled by output pads of integrated circuits. Due to the higher currents conducted by the driver circuits, they become the most susceptible to failure. Performance monitoring of the driver circuits themselves has not been performed in conventional designs because propagation delays vary so widely, usually being longer than one system clock cycle. The driver circuits introduce delay as do output pads, and propagation paths. The propagation delay will also vary depending upon temperature, voltage and process. Fault isolation has been typically performed by looking for bad data at the receiver. However, when a fault is detected, it is not possible to isolate the fault to the transmitter or the receiver or the fibre link itself. In conventional systems, alarms often falsely convict the receiver card of failure.

U.S. Pat. No. 4,558,447 which issued Dec. 10, 1985 to Freeman et al., entitled "Self-testing Facilities of Off-chip Drivers for Processor and the Like" discloses a simple circuit which compares the input and output signals of an off-chip driver but requires the use of two clocks, clock A for the data and clock B for the test circuit. The added complexity of the second clock (clock B) introduces additional reliability issues and must further be adjusted to handle the variable delay which is introduced by the driver circuitry.

Also the Freeman design is incapable of handling functional, in-circuit at speed testing with off chip driver delays exceeding one clock period.

SUMMARY OF THE INVENTION

It is an object of the invention to provide an improved self-test circuit which is capable of testing circuitry which introduces an unknown delay upon a serial digital signal.

According to a first broad aspect, the invention provides a self-test circuit connected to receive first and second serial digital signals for identifying errors between the first digital signal and the second digital signal; the second digital signal being a version of the first digital signal which may contain errors, and which is delayed an unknown amount which is less than a predetermined maximum with respect to the first digital signal, the self-test circuit comprising: a bit string detection circuit which detects in the first digital signal bit strings of a predetermined length, the bits in each detected bit string being all ones or all zeros, the predetermined length of the bit strings being selected such that a time required to detect the bit strings is greater than the predetermined maximum; a comparator which, when the bit string detection circuit detects such a string of bits, compares a most recently received bit of the second digital signal with the detected bit string, and generates an error signal when a mismatch is detected.

According to a second broad aspect, the invention provides an optical transmitter arrangement comprising a signal source circuit which produces or receives a first serial digital signal, a transmitter circuit which amplifies the first serial digital signal to produce a second serial digital signal which has an unknown delay which is less than a predetermined maximum with respect to the first digital signal, a light emitting diode for converting the second digital signal into an optical signal for transmission over an optical fibre, and a self-test circuit connected to receive the first and second digital signals for identifying errors between the first digital signal and the second digital signal, the self-test circuit comprising: a bit string detection circuit which detects in the first digital signal bit strings of a predetermined length, the bits in each detected bit string being all ones or all zeros, the predetermined length of the bit strings being selected such that a time required to detect the bit strings is greater than the predetermined maximum; a comparator which, when the bit string detection circuit detects such a string of bits, compares a most recently received bit of the second digital signal with the detected bit string, and generates an error signal when a mismatch is detected.

According to a third broad aspect, the invention provides a method of detecting errors in a second serial bit stream with respect to a first serial bit stream when an unknown variable delay exists in the second serial bit stream, the method comprising the steps of: searching the first serial bit stream for a bit string of a predetermined length, the bit string being all ones or all zeros; comparing a most recent bit in the second serial bit stream to the bit string and generating an error signal if a mismatch is detected.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
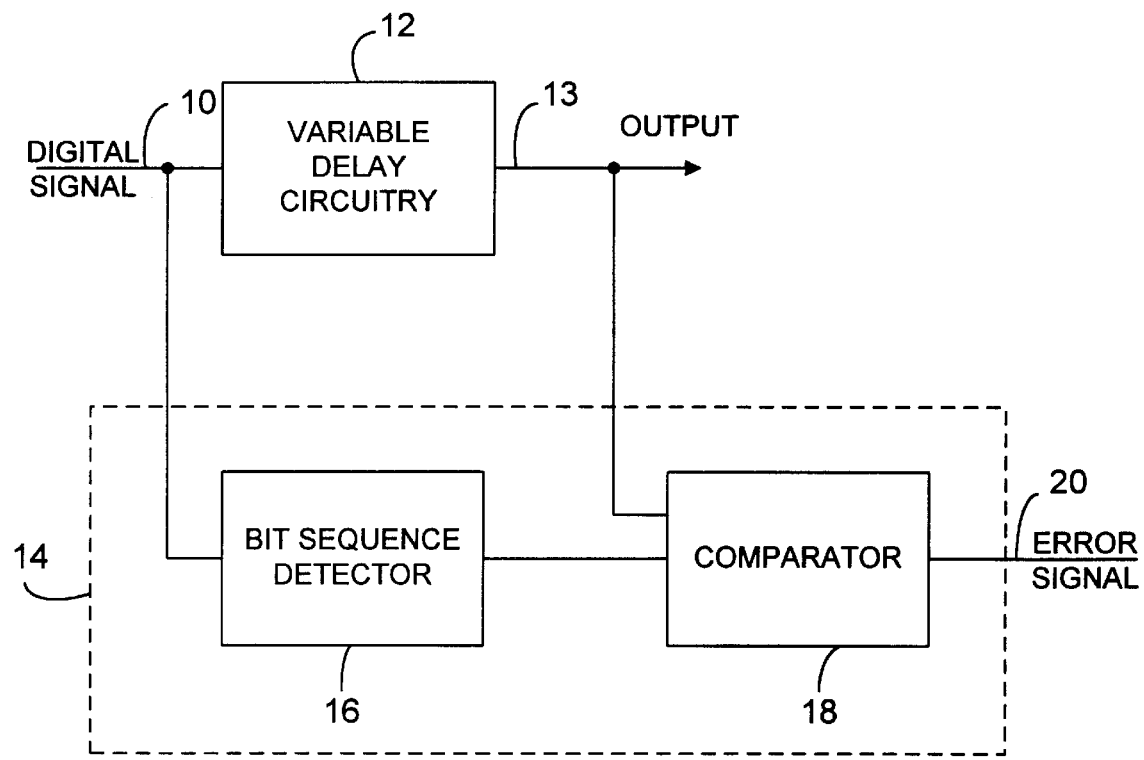
FIG. 1 is a block diagram of a generic self-test circuit according to the invention.
Figure 2:
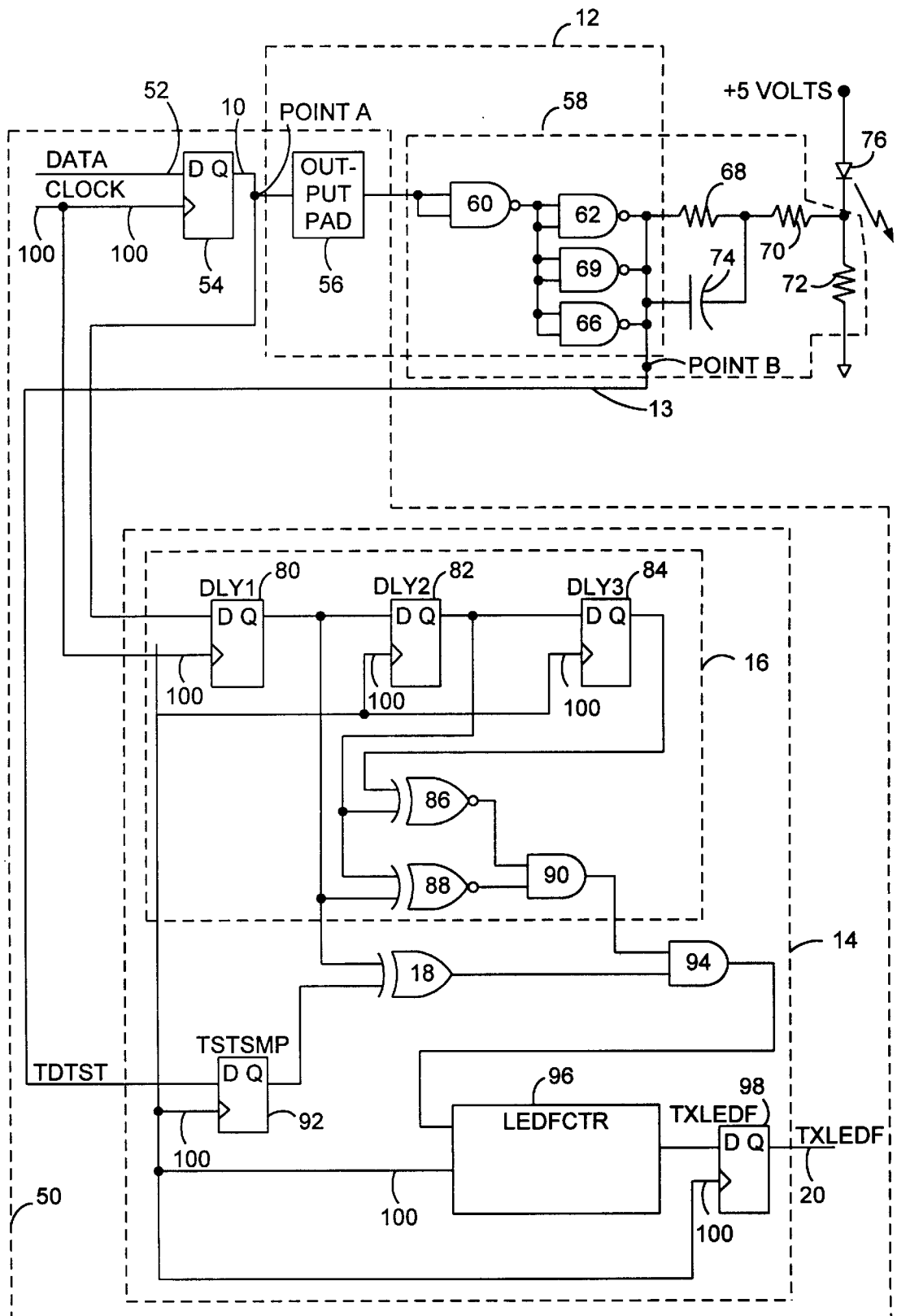
FIG. 2 is a block diagram of a specific implementation of a self-test circuit according to the invention.

It is noted that in the description of FIGS. 1 and 2, signals are referred to synonymously with the lines which carry them. Like reference numerals are used to identify like components.

Referring firstly to FIG. 1, a digital signal 10 is input to a variable delay circuitry 12 with unknown delay which produces an output signal 13. The variable delay circuitry 12 may be an output transmitter circuit for example. The circuitry 12 may amplify the digital signal 10 in addition to delaying the digital signal but does not alter the information content of the signal under normal operation. The variable delay circuitry 12 is subject to failure in which case the information content of output signal 13 may differ from that of the digital signal 10. A self-test circuit according to an embodiment of the invention generally indicated by 14, is provided to detect this type of failure. The self-test circuit 14 includes a bit sequence detector 16 and a comparator 18. The function of the bit sequence detector 16 is to detect bit strings of consecutive ones or zeros in the digital signal 10 having a predetermined length. For example, it might be configured to detect three consecutive ones or three consecutive zeros. When such a bit string is detected, the comparator 18 is triggered, and a comparison between the most recent output bit produced at the output 13 and the bit which is consecutive in the detected string is made, this being a zero in the case of a string of zeros and a one in the case of a string of ones. The effect of the bit sequence detector 16 is to delay the digital signal 10 by the length of the bit sequence being detected. The output 13 of the variable delay circuitry 12 has an unknown delay. The bit sequence length is selected such that the bit sequence detector 16 introduces a delay into the digital signal 10 which is longer than the estimated or predetermined maximum delay of the variable delay circuitry 12. Thus, when a comparison of the most recent output bit of the output 13 with the bit sequence is made, it is not known which bit in the bit sequence detected in the digital signal 10 corresponds with the output bit, but it is known that it is one of the bits in the detected sequence. Since all the bits in the detected sequence are the same (either all ones or all zeros), a comparison with any bit in the detected sequence is equivalent to a comparison with the unknown bit in the sequence which corresponds with the output bit. Thus when the comparison performed by the comparator 18 indicates that the two bits are not the same, then a failure has occurred, and an error signal 20 is generated by the comparator 18.

Now a preferred embodiment of the invention will be described with reference to FIG. 2. An ASIC (application specific integrated circuit) 50 has circuitry (not shown) which is generating a digital signal 52 which is to be output by the ASIC. This signal 52 is fed through a D-flip-flop 54 and an output pad 56 connected to an external conductor pin (not shown) of the ASIC 50. The output pad 56 is provided to increase the drive capability at the output of the ASIC 50 sufficient to drive the external conductor pin. The external conductor pin is connected to a transmitter circuit 58 which in the embodiment illustrated includes four NAND gates 60,62,64,66, three resistors 68,70,72, and a capacitor 74. The output of the transmitter circuit 58 is connected to an LED (light emitting diode) 76 which generates an optical signal for transmission on an optical fibre (not shown). The circuitry which prepares the digital signal 52 for output and produces the optical signal is the most susceptible to failure, in which case the information content of the signal transmitted on the optical fibre contains errors with respect to the digital signal 52. A self-test circuit is provided for comparing the signals at two points in this circuitry and determining when errors occur. In the illustrated embodiment, the first signal point, labelled "Point A",(the signal at Point A being numbered 10 in correspondence with the digital signal of FIG. 1) is located between the D-flip-flop 54 and the output pad 56, and the second signal point, labelled "Point B" (the signal at Point B being numbered 13 in correspondence with the output signal of FIG. 1) is located after the four NAND gates 60,62,64,66. The output pad 56 and the NANDS 60,62,64,68 are much more likely to fail than the discrete components (the resistors 68,70,72 and the capacitor 74) and the diode 76. Thus, in this example, variable delay circuitry 12 consists of the output pad 56 and a part of the transmitter circuit 58.

The self-test circuit 14 includes three D-flip-flops 80,82, 84 connected as a shift register, the first flip-flop 80 receiving the signal 10 from point A. Logic circuitry is provided to detect when the shift register contains a sequence of identical bits, either ones or zeros. In the illustrated embodiment this logic circuitry includes two XNOR gates 86,88 and an AND gate 90. The first XNOR gate 86 indicates TRUE when the second and third flip-flops 82,84 contain the same bits, and the second XNOR gate 88 indicates TRUE when the first and second flip-flops 80,82 contain the same bits. The AND gate 90 indicates TRUE when both the first and second XNOR gates 86,88 indicate TRUE, meaning that all three shift flip-flops 80,82,84 contain the same bits. The D-flip-flops 80,82,84 and the logic circuitry together comprises the bit sequence detector 16.

The signal 13 from Point B is connected to another D-flip-flop 92 the output of which is connected to an input of a comparator 18, which in the illustrated embodiment is an XOR gate. The output of the first flip-flop 80 in the shift register is also connected to an input of the XOR gate 18. The output of the AND gate 90 and the output of the XOR gate 18 are connected as inputs to a further AND gate 94. The output of the AND gate 94 is connected to an error counter circuit 96 which in turn is connected to an output D-flip-flop 98. A system clock signal 100 on the ASIC clocks each of the D-flip-flops 54,80,82,84,92,98.

In operation, the output of the AND gate 90 indicates TRUE when either three ones or three zeros occupy the shift register flip-flops 80,82,84. The output of the XOR gate 18 indicates TRUE when the signal from Point B (after being clocked through the D-flip-flop 92) does not agree with the output of the first shift register flip-flop 80. When the shift register flip-flops 80,82,84 are full of identical bits (AND gate 90 TRUE) and the signal from Point B does not agree with the contents of the shift register (XOR gate 18 true) then the AND gate 94 will output TRUE, indicating that an error has been detected. This is passed to the error counting circuit 96 which produces an extended duration error signal to ensure that it is picked up by subsequent logic in the ASIC. Each error detected will cause an extended error signal to be produced. An error is detected each time the output of the AND gate 94 indicates TRUE during a cycle of the system clock signal 100. The self-test circuit 14 will simply continue to monitor the outgoing data at Point B for failures, and does not require any reset action. The error counting circuit 96 has an output 20 (which is clocked through a D-flip-flop 98) which may be triggered every time an error is found, or after a certain number of errors are found, for example.

It is noted that due to the delay of the transmitter circuit, the digital signal at Point B may not be well aligned in time with the system clock signal 100 and this may cause a metastable state (a state somewhere in between a zero and a one) to occur at the output of the D-flip-flop 92 during the first of the three identical bits. The metastable state will decay to a correct state in less than some maximum time. The delay introduced by the shift register flip-flops 80,82,84 should be long enough to handle the largest possible delay introduced by the variable delay circuitry 12, with enough time left over to allow the metastable state to decay.

The following is exemplary verilog RTL (Register Transfer Logic) code for an implementation of the serial output transmitter self-test circuit. In this implementation it is assumed that there are the following minimal required elements: three delay elements (D-flip flops) dly1, dly2, and dly3; an error counter ledfctr; a transmit error indicator txledf; and a transmit state temporary buffer tstsmp. All of these elements have been labelled in FIG. 2. More specifically, dly1 is flip-flop 80, dly2 is flip-flop 82, dly3 is flip-flop 84, ledfctr is error counting circuit 96, txledf is flip-flop 98, and tstsmp is flip-flop 92. Also, "data" refers to the input data signal 52 and "clock" refers to the system clock signal 100. The code reads as follows:

```
/*****************************************************/
always@(posedge clock)
  begin
  dly1 = dly1_N;
  dly2 = dly2_N;
  dly3 = dly3_N;
  txledf = txledf_N;
  ledfctr = ledfctr_N;
  tstsmp = tstsmp_N;
  end
```

-continued

```
always@(dly1 or dly2 or dly3 or tdtst or txledf or ledfctr or
   tstsmp of data)
begin
// implement the fibre transmit self-test circuit
// to insure valid tst data, use 3 clock delay
// to inure error signal is detected by intyerrupt logic use
// 3 bit error counter
dly1_N = data[11];
dly2_N = dly1;
dly3_N = dly2;
tstsmp_N - tdtst;
if (ledfctr != 0)
begin
ledfctr_N = ledfctr - 1;
txledf_N = txledf;
end
else
begin
if (txledf != 0)
  begin
  txledf_N = 0;
  ledfctr_N = 0;
  end
else
 begin
 if ((dly1 == dly2) && (dly1 == dly3))
   begin
   if (tstsmp != dly1)
     begin
     // failure detected
     txledf_N = 1;
     ledfctr_N = 3'bill;
     end
   else
      begin
      txledf_N = 0;
      ledfctr_N = 0;
      end
    end
   else
   begin
   begin
   txledf_N = 0;
   ledfctr_N = 0;
   end
   end
  end
end
/************************************************************/
```

Numerous modifications and variations of the present invention are possible in light of the above teachings. It is therefore to be understood that within the scope of the appended claims, the invention may be practised otherwise than as specifically described herein.

The embodiments of the invention in which an exclusive property or privilege is claimed are defined as follows:

1. A self-test circuit connected to receive first and second serial digital signals for identifying errors between the first digital signal and the second digital signal, the second digital signal being a version of the first digital signal which may contain errors, and which is delayed an unknown amount which is less than a predetermined maximum with respect to the first digital signal, the self-test circuit comprising:
   a bit string detection circuit which detects in the first digital signal bit strings of a predetermined length, the bits in each detected bit string being all ones or all zeros, the predetermined length of the bit strings being selected such that a time required to detect the bit strings is greater than the predetermined maximum;
   a comparator which, when the bit string detection circuit detects such a string of bits, compares a most recently received bit of the second digital signal with the detected bit string, and generates an error signal when a mismatch is detected.

2. A self-test circuit according to claim 1 wherein the bit string detection circuit comprises a shift register and logic for determining when the shift register contains all ones or all zeros.

3. A self-test circuit according to claim 2 wherein shift register comprises three D-flip-flops connected together in serial, the logic being connected to receive the output of each D-flip-flop, and to indicate when a string of three ones or three zeros is contained in the shift register.

4. A self-test circuit according to claim 2 wherein a system clock controls the clocking of bits into the shift register, and the second digital signal is clocked through a D-flip-flop before being compared with the detected bit string.

5. A self-test circuit according to claim 4 wherein to compare the second digital signal with the detected bit string, a comparison of the clocked second digital signal with any of the bits in the shift register is made.

6. A self-test circuit according to claim 5 further comprising a counter circuit for counting the number of errors detected.

7. A self-test circuit according to claim 6 wherein an error alarm is only generated after a certain number of errors has been detected.

8. A self-test circuit according to claim 4 wherein the predetermined length of the bit strings is selected such that the time required to detect the bit strings is greater than the predetermined maximum plus a maximum metastable state decay time in the D-flip-flop through which the second digital signal is clocked.

9. A self-test circuit according to claim 1 forming part of an integrated circuit.

10. A self-test circuit according to claim 9 wherein the variable delay circuit comprises an output pad forming part of the integrated circuit, and a transmitter circuit.

11. An optical transmitter arrangement comprising a signal source circuit which produces or receives a first serial digital signal, a transmitter circuit which amplifies the first serial digital signal to produce a second serial digital signal which has an unknown delay which is less than a predetermined maximum with respect to the first digital signal and which may contain errors with respect to the first serial digital signal, a light emitting diode for converting the second digital signal into an optical signal for transmission over an optical fibre, and a self-test circuit connected to receive the first and second digital signals for identifying errors between the first digital signal and the second digital signal, the self-test circuit comprising:
   a bit string detection circuit which detects in the first digital signal bit strings of a predetermined length, the bits in each detected bit string being all ones or all zeros, the predetermined length of the bit strings being selected such that a time required to detect the bit strings is greater than the predetermined maximum;
   a comparator which, when the bit string detection circuit detects such a string of bits, compares a most recently received bit of the second digital signal with the detected bit string, and generates an error signal when a mismatch is detected.

12. An arrangement according to claim 11 wherein the bit string detection circuit comprises a shift register and logic for determining when the shift register contains all ones or all zeros.

13. An arrangement according to claim 12 wherein shift register comprises three D-flip-flops connected together in serial, the logic being connected to receive the output of each D-flip-flop, and to indicate when a string of three ones or three zeros is contained in the shift register.

14. An arrangement according to claim 12 wherein a system clock controls the clocking of bits into the shift register, and the second digital signal is clocked through a D-flip-flop before being compared with the detected bit string.

15. An arrangement according to claim 14 wherein to compare the second digital signal with the detected bit string, a comparison of the clocked second digital signal with any of the bits in the shift register is made.

16. An arrangement according to claim 15 further comprising a counter circuit for counting the number of errors detected.

17. An arrangement according to claim 16 wherein an error alarm is only generated after a certain number of errors has been detected.

18. A self-test circuit according to claim 14 wherein the predetermined length of the bit strings is selected such that the time required to detect the bit strings is greater than the predetermined maximum plus a maximum metastable state decay time in the D-flip-flop through which the second digital signal is clocked.

19. A method of detecting errors in a second serial bit stream with respect to a first serial bit stream when the second serial bit stream is a version of the first serial bit stream which has an unknown variable delay and may contain errors, the method comprising the steps of:

searching the first serial bit stream for a bit string of a predetermined length, the bit string being all ones or all zeros;

upon detection of the bit string, comparing a most recent bit in the second serial bit stream to the bit string and generating an error signal if a mismatch is detected.

20. A method according to claim 19 wherein the step of searching comprises the steps of:

feeding the first serial bit stream into a shift register and determining when the shift register contains all ones and all zeros.

21. A method according to claim 20 further comprising the step of:

counting the number of mismatches detected and generating an error output when the number of mismatches is greater than a predetermined number.

* * * * *